(12) United States Patent
Shao

(10) Patent No.: US 11,401,857 B2
(45) Date of Patent: Aug. 2, 2022

(54) GRADIENT-TYPE EXPANSION TANK FOR AUTOMOBILE

(71) Applicant: Jing-Jin Electric Technologies Co., Ltd., Beijing (CN)

(72) Inventor: Kuizhu Shao, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 16/980,674

(22) PCT Filed: Apr. 16, 2019

(86) PCT No.: PCT/CN2019/082801
§ 371 (c)(1),
(2) Date: Sep. 14, 2020

(87) PCT Pub. No.: WO2019/201226
PCT Pub. Date: Oct. 24, 2019

(65) Prior Publication Data
US 2021/0025316 A1  Jan. 28, 2021

(30) Foreign Application Priority Data
Apr. 19, 2018 (CN) .......................... 201810354290.8

(51) Int. Cl.
*F02P 11/02* (2006.01)
*F01P 3/00* (2006.01)
(Continued)

(52) U.S. Cl.
CPC ............. *F01P 11/0204* (2013.01); *F01P 3/00* (2013.01); *F01P 11/029* (2013.01); *B60K 11/02* (2013.01); *F01P 2003/001* (2013.01)

(58) Field of Classification Search
CPC .. F01P 11/029; F01P 11/0238; F01P 11/0247; F01P 11/0285
See application file for complete search history.

(56) References Cited

U.S. PATENT DOCUMENTS

| | | | | |
|---|---|---|---|---|
| 3,520,329 A | * | 7/1970 | Weber | B60K 15/03 280/830 |
| 4,366,858 A | * | 1/1983 | Moranne | F28F 9/0231 165/104.32 |

(Continued)

FOREIGN PATENT DOCUMENTS

| | | |
|---|---|---|
| CN | 203420776 U | 2/2014 |
| CN | 103161560 B | 2/2015 |

(Continued)

OTHER PUBLICATIONS

International Search Report issued in PCT/CN2019/082801, dated Jun. 20, 2019, 6 pages.

(Continued)

*Primary Examiner* — Long T Tran
(74) *Attorney, Agent, or Firm* — Arentfox Schiff LLP

(57) ABSTRACT

An engine-and-electric-machine assembly is provided that includes an engine and an electric machine, a crankshaft being provided in the engine, the crankshaft including a main body and an extension section that extends out to the exterior of the engine, the extension section forming a rotation shaft of the electric machine, and a rotor of the electric machine being mounted on the extension section, wherein a terminal of the rotation shaft is connected to a coolant pump, a rotor of the coolant pump is mounted to the rotation shaft, and while the rotation shaft is rotating the rotation shaft drives the coolant pump to provide coolant to the electric machine. By connecting the rotation shaft of the electric machine to the coolant pump, the pump can be (Continued)

highly integrated into the system and reduce manufacturing cost.

10 Claims, 1 Drawing Sheet

(51) Int. Cl.
    *F01P 11/02*     (2006.01)
    *B60K 11/02*     (2006.01)

(56) References Cited

U.S. PATENT DOCUMENTS

| | | | | |
|---|---|---|---|---|
| 5,205,720 | A * | 4/1993 | Nagata | F04B 17/00 417/328 |
| 10,202,889 | B2 * | 2/2019 | Zhang | F16N 39/002 |
| 2010/0206882 | A1 * | 8/2010 | Wessels | F01P 11/029 220/562 |
| 2011/0079140 | A1 * | 4/2011 | Baseley | F15B 1/26 92/90 |
| 2011/0109001 | A1 * | 5/2011 | Bortolussi | F02B 47/02 261/120 |
| 2016/0116201 | A1 * | 4/2016 | Tansley | F25D 16/00 62/457.2 |
| 2018/0283261 | A1 * | 10/2018 | Morishita | F01P 11/029 |

FOREIGN PATENT DOCUMENTS

| | | |
|---|---|---|
| CN | 206054077 U | 3/2017 |
| CN | 206600198 U | 10/2017 |
| CN | 108397275 A | 8/2018 |
| CN | 208281036 U | 12/2018 |
| DE | 4103523 A1 * 8/1992 | ............ F01P 11/029 |
| JP | S54-141603 U | 10/1979 |
| JP | S61-145827 U | 9/1986 |
| JP | H09264136 A | 10/1997 |
| JP | 2000-73763 A | 3/2000 |
| JP | 2014043863 A | 3/2014 |
| KR | 101682832 B1 | 12/2016 |

OTHER PUBLICATIONS

JPO, Japanese Office Action dated Nov. 9, 2021 issued in Japanese counterpart application No. 2020-556950.

* cited by examiner

GRADIENT-TYPE EXPANSION TANK FOR AUTOMOBILE

CROSS-REFERENCE TO RELATED APPLICATIONS

This application is a U.S. National Stage entry under 35 U.S.C. § 371 based on International Application No. PCT/CN2019/082801, filed on Apr. 16, 2019, which claims priority to Chinese Patent Application No. 201810354290.8, filed on Apr. 19, 2018. The embodiment of the priority applications are hereby incorporated herein in their entirety by reference.

TECHNICAL FIELD

The present disclosure relates to the technical field of multi-cooling systems of new-energy vehicles, and particularly relates to a step-type vehicle expansion water tank.

BACKGROUND

New-energy vehicles are an emerging field of the automobile industry. The vehicle power system is required to be equipped with 2-3 sets of mutually independent cooling systems, and each of the cooling systems is required to be equipped with an expansion water tank. The cooling water for the electric motor and the electric-motor controller of a new-energy vehicle requires the inlet temperature of 65° C. or below, and the cooling water for the power battery requires the inlet temperature of 35° C. or below. Because of the difference between the water temperatures, the cooling systems and the filling ports are very difficult to be shared. Hybrid power vehicles further have a cooling system for the engine, and the temperature of the water inlet of the cooling system for the engine is approximately 90° C. The three sets of cooling systems, because of the temperature differences of the cooling waters, cannot be shared, which results in that the filling ports of the entire vehicle cannot be integrated, the room for arrangement of engine compartment is limited, the arrangement of the entire vehicle is difficult, the usage and maintenance by the user are inconvenient, and the cost of everyday maintenance is high.

SUMMARY

Aiming at the above problems, an object of the present disclosure is to provide a step-type vehicle expansion water tank, to solve the problem of the conventional vehicles that the expansion water tanks are independently provided and cannot be shared, which results in that the filling ports of the entire vehicle cannot be integrated, the arrangement of the entire vehicle is difficult, and the usage and maintenance by the user are inconvenient.

In order to achieve the above objects, the present disclosure employs the following technical solutions:

A step-type vehicle expansion water tank, wherein the step-type vehicle expansion water tank comprises a water-tank body, an interior of the water-tank body is separated by two water separating plates of different heights into a higher chamber, a middle chamber and a lower chamber, the chambers have tops that are communicated and bottoms that are individually provided with a water outlet, and a filling port is provided at a top of the water-tank body.

Preferably, each of the tops of the higher chamber, the middle chamber and the lower chamber is provided with a water blocking plate that is horizontally disposed, and the water blocking plate is provided with at least one water-level balancing port.

Preferably, the water blocking plates at the tops of the higher chamber, the middle chamber and the lower chamber have heights that are sequentially reduced, to present a step-type structure.

Preferably, heights of two of the water separating plates are greater than heights of horizontal positions of the water blocking plates that are located on two sides thereof.

Preferably, the water-tank body, the water separating plates and the water blocking plates are made of a polymer material.

Preferably, the water-level balancing port is provided at a central position of the water blocking plate.

Preferably, a steam releasing port is provided at an upper part of the water-tank body.

Preferably, a filled-amount regulating port in communication with the lower chamber is provided at a lower part of the water-tank body.

Preferably, the filling port corresponds to the higher chamber, and a covering plate is provided over the filling port.

Preferably, each of interiors of the higher chamber, the middle chamber and the lower chamber is provided with a water-level sensor.

The advantages and advantageous effects of the present disclosure are as follows. The present disclosure integrates the devices for filling the cooling systems for the electric motor, for the power battery and for the engine, which reduces the room for arrangement required by the entire vehicle, and facilitates the usage by the user.

The present disclosure, by using the step-type structure, can integrate the filling processes of the cooling systems for the engine, for the electric motor and for the power battery. The step-type structure realizes the water blocking between the areas, and even if the vehicle is running on a steep slope, the mutual mixing of the waters can be prevented. When the vehicle has recovered to run on an even road surface, the waters of the independent systems quickly recover.

In the present disclosure, the chambers can be defined and used according to the temperatures of the waters that work normally, which can reduce the effect of the water temperature radiation. The horizontal dimensions of the chambers and the height differences between the water blocking plates may be flexibly defined according to the particular application environments.

Figure 1:
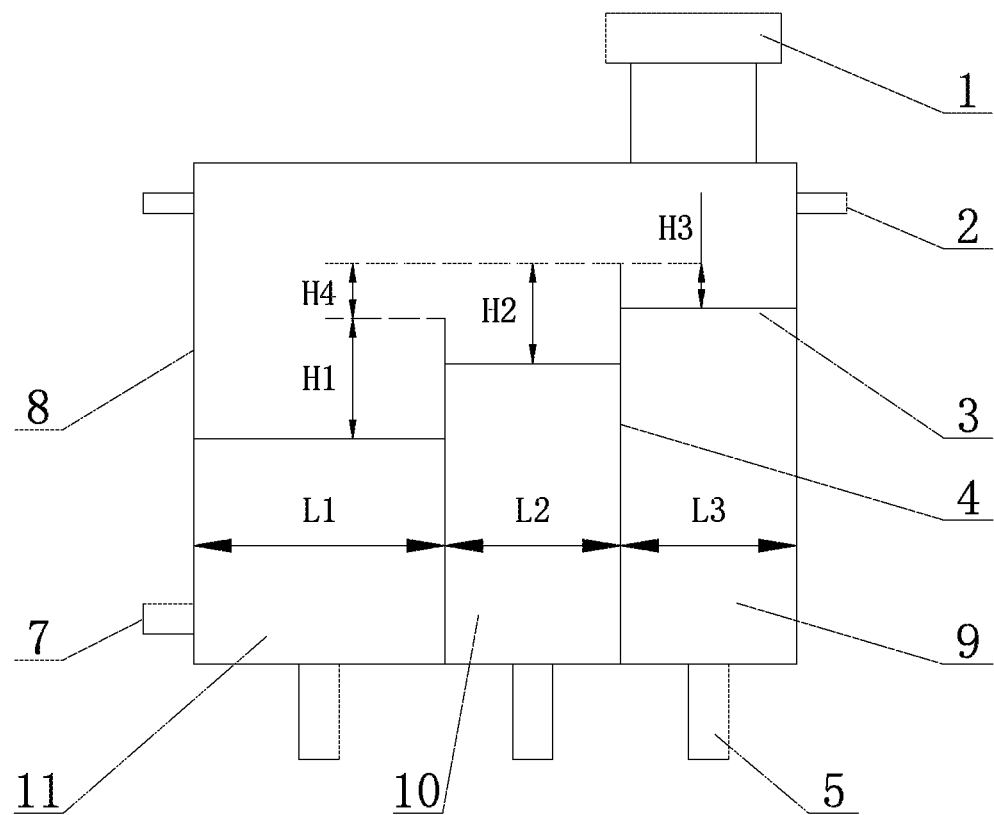
FIG. 1 is a schematic structural diagram of a step-type vehicle expansion water tank according to the present disclosure.

In the drawings: 1 is the filling port, 2 is the steam releasing port, 3 is the water blocking plate, 4 is the water separating plate, 5 is the water outlet, 6 is the water-level balancing port, 7 is the filled-amount regulating port, 8 is the tank body, 9 is the higher chamber, 10 is the middle chamber, and 11 is the lower chamber.

DETAILED DESCRIPTION

In the conventional vehicle expansion water tanks, the filling ports of the cooling systems for the engine, for the electric motor and for the power battery are independently provided and cannot be shared, which results in that the filling ports of the entire vehicle cannot be integrated, the arrangement of the entire vehicle is difficult, and the usage and maintenance by the user are inconvenient.

Aiming at the above problems, the present disclosure, by using the step-type structure, can integrate the devices for filling the cooling systems for the engine, for the electric motor and for the power battery, which reduces the room for arrangement required by the entire vehicle, and facilitates the usage by the user. The step-type structure realizes the water blocking between the areas, and even if the vehicle is running on a steep slope, the mutual mixing of the waters can be prevented. When the vehicle has recovered to run on an even road surface, the waters of the independent systems quickly recover.

In order to make the objects, the technical solutions and the advantages of the present disclosure clearer, the present disclosure will be described below in detail in conjunction with the drawings and the particular embodiments.

As shown in FIG. 1, the step-type vehicle expansion water tank according to the present embodiment comprises a water-tank body 8 and water separating plates 4, the interior of the water-tank body 8 is separated by two water separating plates 4 of different heights into a higher chamber 9, a middle chamber 10 and a lower chamber 11, the tops of the higher chamber 9, the middle chamber 10 and the lower chamber 11 are communicated, the bottoms are individually provided with a water outlet 5, and a filling port 1 is provided at the top of the water-tank body 8.

Each of the tops of the higher chamber 9, the middle chamber 10 and the lower chamber 11 is provided with a water blocking plate 3 for closing the chambers, and the water blocking plates 3 can prevent or mitigate the mixing of the waters in neighboring chambers during the operation of the vehicle. The water blocking plates 3 at the tops of the higher chamber 9, the middle chamber 10 and the lower chamber 11 are horizontally provided and have heights that are sequentially reduced, to present a step-type structure.

Figure 2:
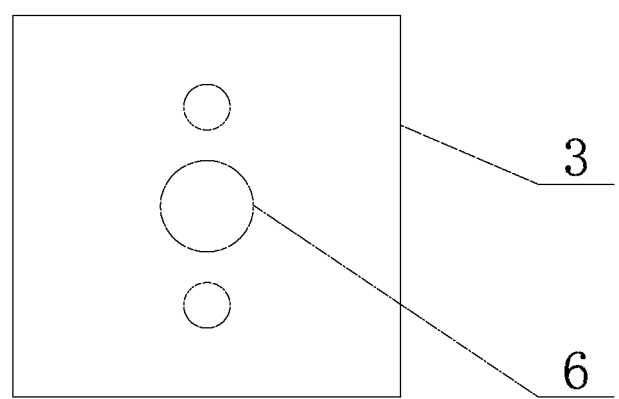
FIG. 2 is a schematic structural diagram of the water blocking plate according to the present disclosure.

As shown in FIG. 2, each of the water blocking plates 3 is provided with at least one water-level balancing port 6, and the water-level balancing port 6 is provided at a central position of the water blocking plate 3. In the present embodiment, the water blocking plate 3 is provided with three water-level balancing ports 6, to balance the liquids inside and outside the chambers.

The heights of two water separating plates 4 are less than that of the top of the water-tank body 8, and are greater than those of the horizontal positions of the water blocking plates 3 on the two sides thereof. In other words, the height of the water separating plate 4 located between the higher chamber 9 and the middle chamber 10 is greater than the horizontal heights of the water blocking plates 3 at the tops of the higher chamber 9 and the middle chamber 10, and the height of the water separating plate 4 between the middle chamber 10 and the lower chamber 11 is greater than the horizontal heights of the water blocking plates 3 at the tops of the middle chamber 10 and the lower chamber 11.

The filling port 1 corresponds to the higher chamber 9, and a covering plate is provided over the filling port 1. The covering plate can seal the water-tank body 8, to reduce the loss of the coolant, and increase the working pressure of the system, and the covering plate may be opened to release the pressure or fill the required coolant.

A steam releasing port 2 horizontally disposed is provided at the upper part of the water-tank body 8. In the present embodiment, two steam releasing ports 2 are symmetrically provided at the upper part of the water-tank body 8, and the two steam releasing ports 2 are individually provided above the higher chamber 9 and the lower chamber 11.

A filled-amount regulating port 7 in communication with the lower chamber 11 is provided at the lower part of the water-tank body 8, and the filled-amount regulating port 7 is used to control the liquid level of the coolant in the lower chamber 11. Each of the interiors of the higher chamber 9, the middle chamber 10 and the lower chamber 11 is provided with a water-level sensor, to in time warn when the water level is too low or too high.

The water-tank body 8, the water separating plates 4 and the water blocking plates 3 are made of heat-resistant polymer materials with a low conductivity coefficient, such as a PP material. Therefore, they have a good effect of heat insulation, and the chambers do not have heat transfer therebetween, and can operate independently. The water-tank body 8 is transparent, and the liquid levels in the chambers can be seen. The quantities of the water outlets 5 and the steam releasing ports 2 of the water-tank body 8 may be increased or reduced according to the practical demands.

The widths L1, L2 and L3 of the lower chamber 11, the middle chamber 10 and the higher chamber 9 may be adjusted according to the demands on the cooling amount of their respective water circulations. The volume ratio of the s of the chamber of the upper parts to the coolant in the lower part of each of the higher chamber 9, the middle chamber 10 and the lower chamber 11 may be determined according to the demand on the total expansion space of the coolants of the high-temperature and low-temperature cooling systems. The distances H1, H2 and H3 between the water blocking plates 3 and the tops of the water separating plates 4 and the height difference H4 between the two water separating plates 4 may be adjusted according to the usage environments of the vehicle and the controlling on the water exchange amount. The chamber usage may be defined according to the actual operating temperatures of the coolants, which can reduce the amount of the thermal radiation therebetween.

In the present embodiment, the water outlet 5 at the bottom of the higher chamber 9 is in communication with the cooling system for the power battery, to provide the coolant to the cooling system for the power battery. The water outlet 5 at the bottom of the middle chamber 10 is in communication with the cooling system for the electric motor and the electric-motor controller, to provide the coolant to the cooling system for the driving electric motor. The lower chamber 11 is in communication with the cooling system for the engine, to provide the coolant to the cooling system for the engine.

The principle of the operation of the present embodiment is as follows.

The interior of the water-tank body 8 of the expansion water tank is added two water separating plates 4 of different heights, to separate the water-tank body 8 into three mutually independent chambers, i.e., the lower chamber 11, the middle chamber 10 and the higher chamber 9. The water blocking plates 3 are added at the top of each of the chambers, and the water-level balancing port 6 is provided at the center of each of the water blocking plates 3. The initial filled amount is below the covering plate, and the water blocking plates 3 can prevent or mitigate the mixing of the waters in neighboring chambers during the operation of the vehicle.

During the filling, the higher chamber 9 may be firstly filled up, the coolant flows over the top of the water separating plate 4 into the middle chamber 10, the middle chamber 10 is filled up, and then the coolant flows over the top of the another water separating plate 4 into the lower chamber 11. The filling is slightly below the standard filling, and the liquid level of the coolant in the lower chamber 11 may be controlled by adding the filled-amount regulating port 7. The coolants inside the lower chamber 11, the middle chamber 10 and the higher chamber 9 are separated by the water separating plates 4, which can insulate heat, and the chambers do not have heat transfer therebetween, and can operate independently. In use, the liquid levels of the lower chamber 11, the middle chamber 10 and the higher chamber 9 will gradually become balanced. A filling assisting tool may also be provided, whereby the filling of each of the chambers is independently controlled.

The present embodiment, by using the step-type structure, can integrate the filling processes of the cooling systems for the engine, for the electric motor and for the power battery. The step-type structure realizes the water blocking between the areas, and even if the vehicle is running on a steep slope, the mutual mixing of the waters can be prevented. When the vehicle has recovered to run on an even road surface, the waters of the independent systems quickly recover. The water blocking plates 3 can prevent or mitigate the mixing of the waters in neighboring chambers during the operation of the vehicle.

The present embodiment integrates the devices for filling the cooling systems for the electric motor, for the power battery and for the engine, which reduces the room for arrangement required by the entire vehicle, and facilitates the usage by the user.

The above are merely particular embodiments of the present disclosure. By the teaching of the present disclosure, a person skilled in the art can make other modifications or variations on the basis of the above embodiments. A person skilled in the art should understand that the above particular descriptions are only for the purpose of better interpreting the present disclosure, and the protection scope of the present disclosure should be subject to the protection scope of the claims.

What is claimed is:

1. A step-type vehicle expansion water tank comprising:
   a water-tank body having an interior that is separated by two water separating plates configured to insulate heat and being of different heights into a higher chamber having a top;
   a middle chamber; and
   a lower chamber,
   wherein the middle and lower chambers have tops that are communicated and bottoms that are individually provided with a water outlet,
   wherein a filling port is disposed at a top of the water-tank body,
   wherein each of the tops of the higher chamber, the middle chamber and the lower chamber is provided with a water blocking plate for closing the respective chamber, and each water blocking plate includes at least one water-level balancing port, and
   wherein the water blocking plates at the respective tops of the higher chamber, the middle chamber and the lower chamber are horizontally provided and have heights that are sequentially reduced to provide a step-type structure.

2. The step-type vehicle expansion water tank according to claim 1, wherein respective heights of two of the water separating plates are greater than heights of horizontal positions of the water blocking plates that are located on two sides thereof.

3. The step-type vehicle expansion water tank according to claim 1, wherein the water-tank body, the water separating plates and the water blocking plates are made of a polymer material.

4. The step-type vehicle expansion water tank according to claim 1, wherein the water-level balancing port is provided at a central position of the water blocking plate.

5. The step-type vehicle expansion water tank according to claim 1, further comprising a steam releasing port disposed at an upper part of the water-tank body.

6. The step-type vehicle expansion water tank according to claim 1, further comprising a filled-amount regulating port in communication with the lower chamber that is disposed at a lower part of the water-tank body.

7. The step-type vehicle expansion water tank according to claim 1, wherein the filling port corresponds to the higher chamber, and a covering plate is provided over the filling port.

8. The step-type vehicle expansion water tank according to claim 1, wherein each of interiors of the higher chamber, the middle chamber and the lower chamber is provided with a water-level sensor.

9. The step-type vehicle expansion water tank according to claim 1, further comprising a steam releasing port disposed at an upper part of the water-tank body.

10. The step-type vehicle expansion water tank according to claim 1, further comprising a filled-amount regulating port in communication with the lower chamber and that is disposed at a lower part of the water-tank body.

* * * * *